P. MacGAHAN.
ELECTRICAL MEASURING INSTRUMENT.
APPLICATION FILED APR. 29, 1915.

1,266,604.

Patented May 21, 1918.

WITNESSES:
R. J. Fitzgerald
J. H. Procter

INVENTOR
Paul MacGahan.
BY Wesley G. Carr
ATTORNEY

UNITED STATES PATENT OFFICE.

PAUL MacGAHAN, OF PITTSBURGH, PENNSYLVANIA, ASSIGNOR TO WESTINGHOUSE ELECTRIC AND MANUFACTURING COMPANY, A CORPORATION OF PENNSYLVANIA.

ELECTRICAL MEASURING INSTRUMENT.

1,266,604.   Specification of Letters Patent.   Patented May 21, 1918.

Application filed April 29, 1915.   Serial No. 24,707.

*To all whom it may concern:*

Be it known that I, PAUL MACGAHAN, a citizen of the United States, and a resident of Pittsburgh, in the county of Allegheny and State of Pennsylvania, have invented a new and useful Improvement in Electrical Measuring Instruments, of which the following is a specification.

My invention relates to electrical measuring instruments and particularly to power-factor meters for polyphase electric circuits.

My invention has for its object to provide a polyphase power-factor meter having a plurality of scales so disposed that the power factor of any phase of a polyphase circuit, to which it is connected, may be indicated upon a separate scale.

Heretofore, power-factor meters having a single scale have been provided for indicating the power factor of polyphase circuits. Devices of this type are accurate when the polyphase circuit is balanced with respect to the loads traversing the several circuits. However, it is impossible to check the accuracy of the same when used on an unbalanced circuit.

I provide a measuring instrument comprising a plurality of potential windings, a single-current winding, a magnetizable armature and a scale that is divided into a plurality of equal zones, the markings of each zone being similar. I provide means for so connecting the current winding in the various phases of an electric circuit that the armature will assume various positions with respect to the zones of the scale to thereby indicate the particular phase in which the current winding is connected and also the power factor of that phase.

Figure 1:
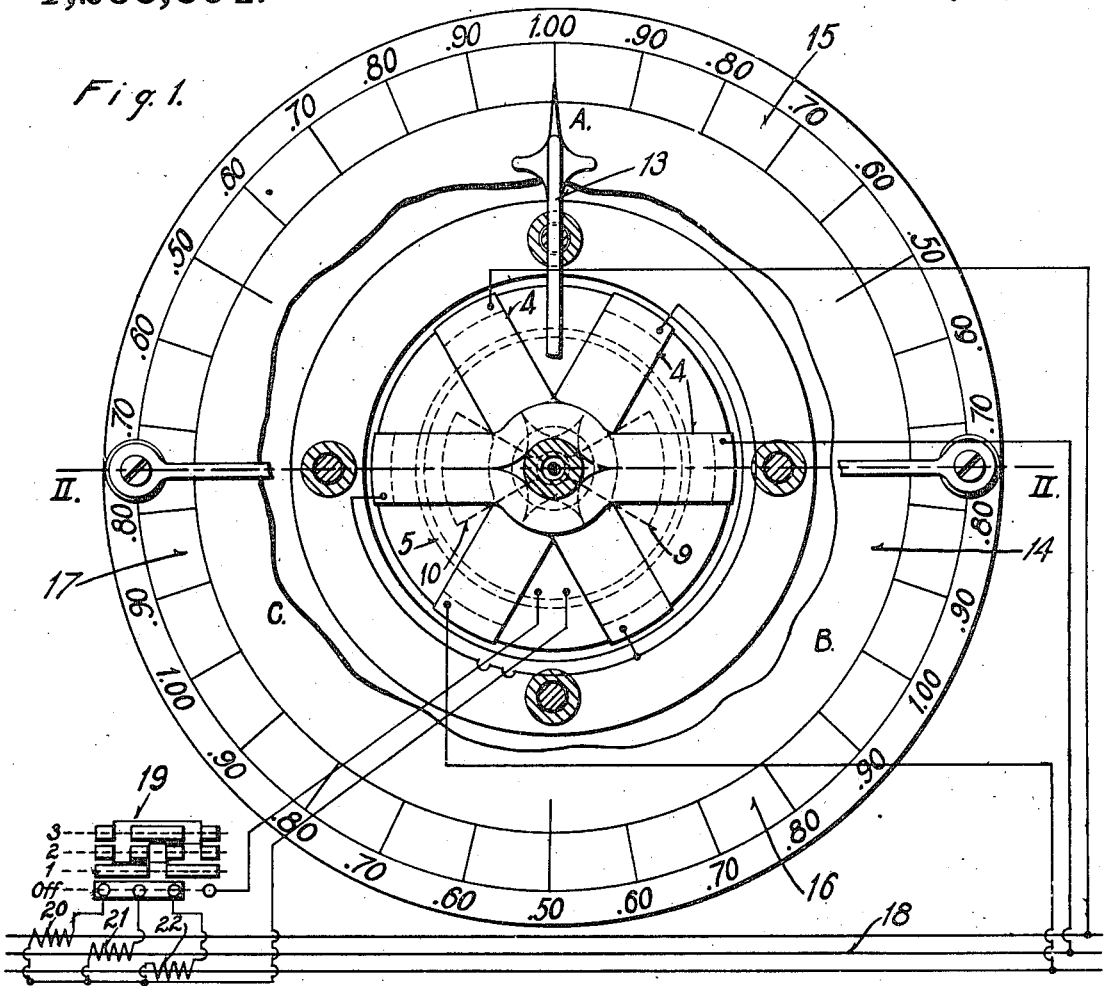
Figure 2:
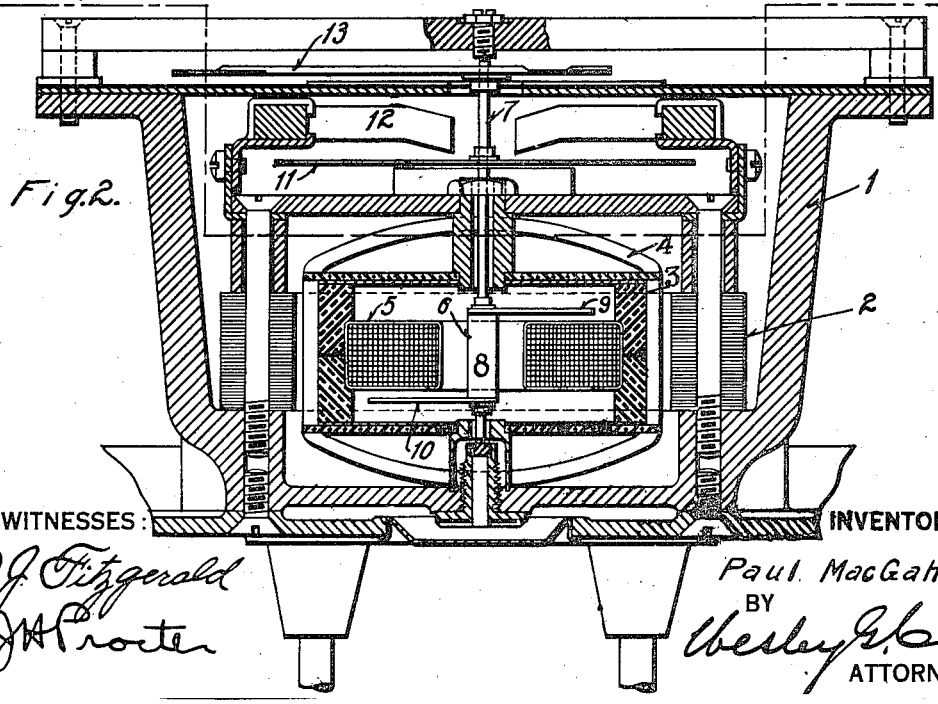

In the accompanying drawings, Figure 1 is a top plan view of a power factor meter with parts broken away to illustrate the arrangement of the windings of the instrument and to show their connection to an electrical circuit, and Fig. 2 is a view taken along the line II—II of Fig. 1.

A frame 1 is provided to support a stationary drum 3 of insulating material around which, and separated therefrom, is a magnetic shield 2. Disposed on the outer surface of the drum are three uniformly spaced potential windings 4 and within the drum is disposed a stationary current winding 5. An armature 6 is mounted upon a shaft 7 and comprises a main magnetizable body portion 8 and two oppositely disposed magnetizable vanes 9 and 10. The vanes 9 and 10 are disposed at the respective ends of the body portion 8, and the armature thus constituted is located within the drum 3 in such position that it is magnetized by the winding 5 and influenced in its operation by the windings 4. A damping disk 11 is also mounted upon the shaft 7 and is adapted to turn between the poles of a permanent magnet 12 for the purpose of damping the oscillation of the armature. An indicator or pointer 13 is mounted upon the shaft 7 to coöperate with a scale 14, substantially as hereinafter set forth.

The scale 14 is divided into three equal zones 15, 16 and 17, the divisions of which are similarly marked with the sine or cosine values of the angles corresponding thereto, depending upon whether indications of the reactive factor or of power factor are desired. The angles are taken with reference to three points along the scale circuit 120° apart, each of the reference points being in the center of one of the zones.

The potential windings 4 are connected to the respective conductors of an electrical circuit 18, and the current winding 5 is connected, through a metering switch 19, to current transformers 20, 21 and 22 that are connected in the respective conductors of the circuit 18.

If it is desired to determine the power factor of any phase of the circuit 18, the switch or controller 19 is turned to such position that the current from that particular phase will traverse the winding 5. A shifting field is produced by the current traversing the windings 4, and the vanes 9 and 10 of the armature 6 are magnetized by the current traversing the winding 5. As the magnetizable vanes are attracted or repelled by the shifting field induced by the windings 4, they will assume such a position that the zero value of the shifting field occurs at the same instant as the zero value of the field produced by the winding 5, thus causing the pointer 13 to indicate the value of the phase angle between the voltage of the circuit and the current in the particular phase.

Since the currents of the several phases are out of phase with each other, the pointer 13 will assume different positions, according to the phase of the current supplied to the winding 5. That is, if the current and voltage are in phase, then, if the current winding is connected in phase A, for example, the pointer will assume the position shown in Fig. 1 of the drawings. However, if it is connected in phase B, it will assume the position indicated by the mark 100% in the zone 16 and, similarly, if it is connected in the phase C, it will assume the position indicated by the mark 100% in zone 17. Thus, if the current and voltage in the various phases are out of phase, the pointer 13 will deviate from the 100% mark to such position as to indicate the phase in which the current winding is connected as well as to indicate the power factor of that phase.

While I have shown the scale marked in values of cosines of the angles represented, it may equally well be marked in values of the sines of the angles. It will, of course, be understood that the number of zones in the scale will depend upon the number of phases in the circuit to which the instrument is connected.

I claim as my invention:

1. In a phase-measuring instrument for a polyphase electric circuit, the combination with a polyphase power-factor meter having a single current winding, a plurality of potential windings, an armature and an indicator, of a scale divided into a plurality of equal zones, and means for connecting the current winding to the various phases of the electric circuit in order that the indicator of the instrument may coöperate only with that zone of the scale which corresponds to the phase in which the current winding is connected.

2. In a power-factor meter for a polyphase electric circuit, the combination with a plurality of potential windings, a single current winding and a rotatable member, of a scale having a plurality of similar markings thereon disposed uniformly around the scale, and means for connecting the current winding to different phases of the electric circuit, whereby different parts of the scale, in coöperation with the rotatable member, indicate in which phase the current winding is connected and the power factor of that phase.

3. A power-factor meter for a polyphase electric circuit comprising current and voltage windings, a movable armature, a pointer operatively connected to the armature and a scale the markings of which are divided into as many equal zones as there are phases in the electric circuit, each of the said zones having divisions provided with like markings.

4. A power-factor meter for a polyphase electric circuit comprising a scale divided into as many uniformly marked equal zones as there are phases of the electric circuit, and a single pointer adapted to coöperate with the zone corresponding to the phase the power factor of which is to be determined.

5. A three-phase power-factor meter comprising a scale divided up into three uniformly marked equal zones, and a single pointer adapted to coöperate with the zone corresponding to the phase the power factor of which is to be determined.

6. A power-factor meter for a three-phase circuit comprising three potential windings, a single current winding, a movable magnetizable armature, an indicator operatively connected to the armature, a scale divided into three uniformly marked equal zones, and means for operatively connecting the current winding in any phase of the electric circuit.

7. In a three phase power-factor meter, the combination with a scale divided into three uniformly marked zones, of a pointer adapted to coöperate with the various zones under predetermined conditions.

8. A power-factor meter for a three phase electric circuit comprising current and voltage windings, a pointer and a scale, the markings of which are uniform and divided into three zones corresponding to the phases of the electric circuit.

In testimony whereof, I have hereunto subscribed my name this 26th day of April 1915.

PAUL MacGAHAN.